Figure 1:
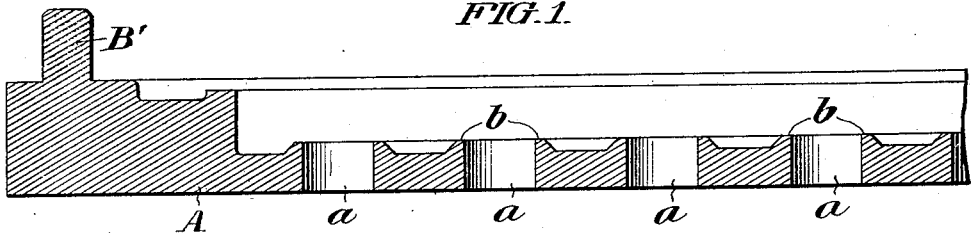

No. 730,643. PATENTED JUNE 9, 1903.
A. M. HANCE.
MEDICINAL CAPSULE AND PROCESS OF MAKING SAME.
APPLICATION FILED MAR. 19, 1903.
NO MODEL. 3 SHEETS—SHEET 1.

WITNESSES: INVENTOR:
Anthony M. Hance,
By Haley & Paul
attorneys.

No. 730,643. PATENTED JUNE 9, 1903.
A. M. HANCE.
MEDICINAL CAPSULE AND PROCESS OF MAKING SAME.
APPLICATION FILED MAR. 19, 1903.
NO MODEL. 3 SHEETS—SHEET 2.

WITNESSES: INVENTOR:
Anthony M. Hance,
By Raly & Paul
Attorneys.

No. 730,643. PATENTED JUNE 9, 1903.
A. M. HANCE.
MEDICINAL CAPSULE AND PROCESS OF MAKING SAME.
APPLICATION FILED MAR. 19, 1903.
NO MODEL. 3 SHEETS—SHEET 3.

WITNESSES: INVENTOR

No. 730,643. Patented June 9, 1903.

UNITED STATES PATENT OFFICE.

ANTHONY M. HANCE, OF PHILADELPHIA, PENNSYLVANIA.

MEDICINAL CAPSULE AND PROCESS OF MAKING SAME.

SPECIFICATION forming part of Letters Patent No. 730,643, dated June 9, 1903.

Application filed March 19, 1903. Serial No. 148,651. (No specimens.)

*To all whom it may concern:*

Be it known that I, ANTHONY M. HANCE, a citizen of the United States, residing at No. 2024 De Lancey street, in the city of Philadelphia, county of Philadelphia, and State of Pennsylvania, have invented certain new and useful Improvements in Medicinal Capsules Containing Both Liquid and Solid Ingredients and in Processes of Manufacturing the Same, of which the following is a specification, reference being had to the accompanying drawings.

There are certain conditions under which it is important that medicaments should be administered in the form of capsules containing both liquid and solid ingredients. Capsules are a preferred means for administering medicinally many oily, bitter, nauseating, pungent, and acrid liquids. I find by combining with the liquid in the capsule a pellet or tablet of a solid material it is possible to regulate the successive functional activity of the remedies, for the gelatinous capsule dissolves shortly after being taken into the stomach, liberating its liquid contents, while the solid tablet, if coated with sugar or some other substance in such a way as to require time for its dissolution, does not take effect until further on in the alimentary tract. Certain other drugs—as, for instance, pepsin—tend by their chemical action to disintegrate a gelatin capsule if they are introduced within it in liquid form. Consequently such drugs cannot be safely mingled with the oils which are commonly administered in capsules, but can only be conveniently combined therewith by being formed into a solid tablet insoluble in the liquid contents of the capsule within which it is introduced. Still other ingredients—such, for instance, as methylene-blue, arsenic, nitrate of silver, bichlorid of mercury, and calcium sulphid—are so difficult or even dangerous to handle in liquid or powdered form that I have discovered that the most practical method of administering the drug is to compress it into a sugar-coated tablet, which in turn is introduced, along with other liquid drugs, into a capsule and thus administered.

Hitherto when both solid and liquid ingredients were to be placed in a capsule the capsule has been manufactured in the old-fashioned way in the form of a small bottle-shaped oval with an opening at one end. Into this the liquid ingredient is introduced by means of a fine nozzle, while the solid ingredient in the form of a pellet or tablet is introduced by means of a specially-devised forceps, which upon being introduced into the capsule by way of its elastic neck enlarges it sufficiently to allow the entrance of the tablet, which is at the same time dropped therein by the forceps. Thereafter the capsule is closed by melting the neck thereof with an implement resembling a soldering-iron. This method is objectionable, both by reason of the imperfection of the resulting capsule and the difficulty and delicacy of the operation of introducing the solid ingredient through the neck, requiring much time and care in the preparation of each individual capsule.

By my invention not only is a better capsule produced, but the solid as well as the liquid ingredient is introduced simultaneously, and a large number of capsules containing such ingredients are manufactured and completed at one time.

Figure 8:
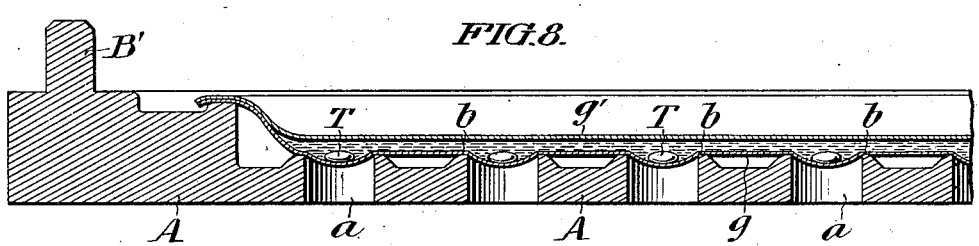
Figure 9:
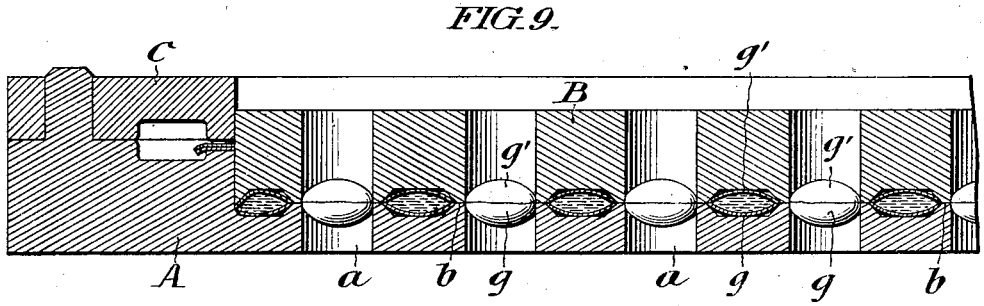
Figure 10:
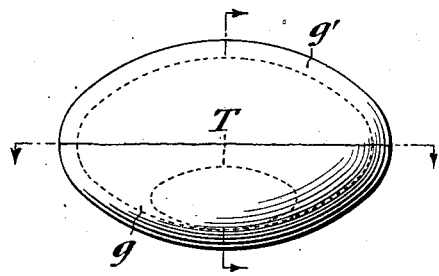
Figure 11:
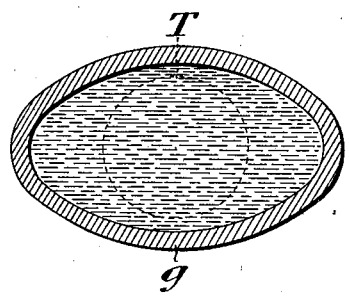
Figure 12:
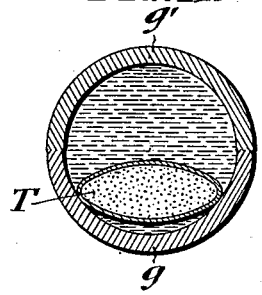

In the accompanying drawings, Figures 1 to 9 are partial sectional views of the compression-dies and tablet-distributers employed in the manufacture of my capsule. These are arranged so as to illustrate the successive steps of the process by which it is manufactured. Figs. 10, 11, and 12 are respectively an elevation, a horizontal central section, and a vertical central cross-section of the resulting capsule.

Fig. 1 is a partial section through the lower compression-die A, sufficient being shown to illustrate the entire die, the size of which is merely a matter of convenience. $a\ a$ are orifices formed in the die and corresponding in shape to the horizontal section of the capsule which is to be produced. The upper edge of each orifice is advanced to form a ridge $b$, with a narrow flat compression surface, by which the gelatin is severed, as will hereinafter be explained. At the corners or edges of the die are guide-posts B', by which the accurate registration of the dies and of the other parts used in conjunction with my process is effected.

Figure 2:
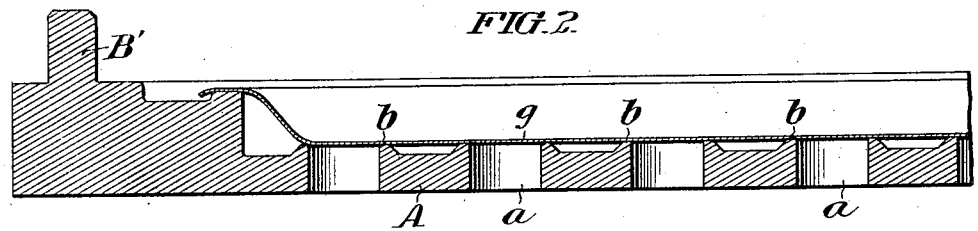
Figure 3:
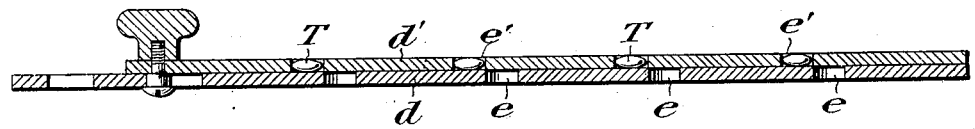
Figure 4:
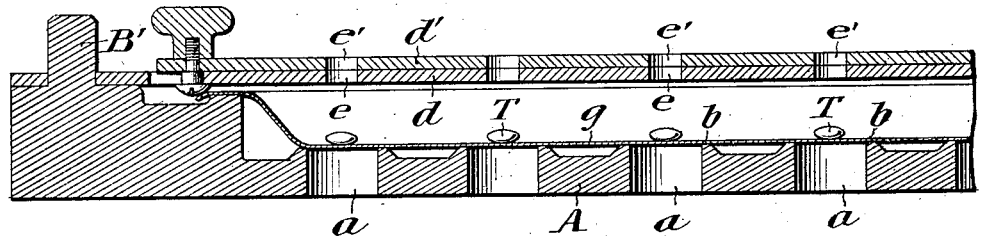
Figure 5:
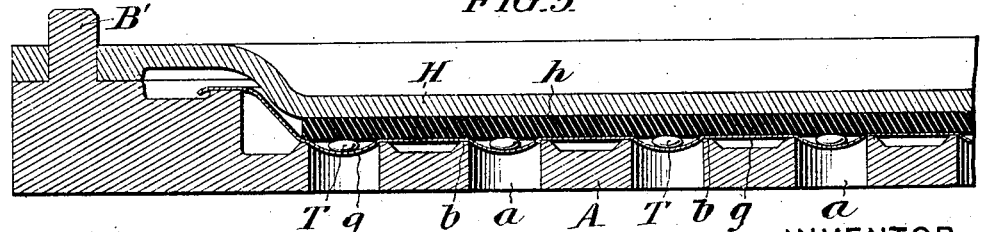
Figure 6:
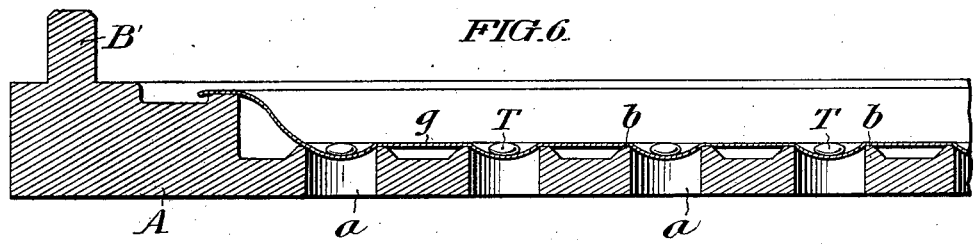
Figure 7:
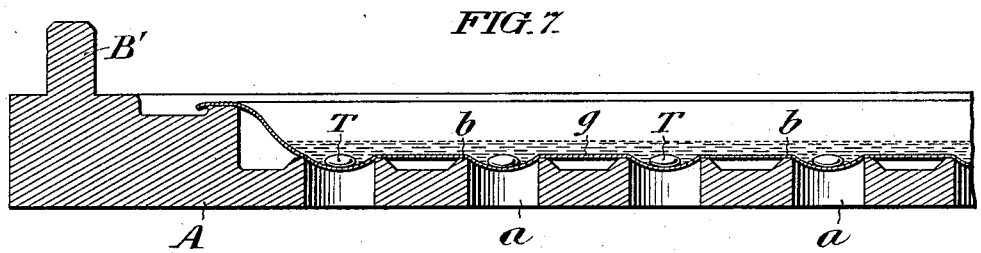

As the first step of my process for the manufacture of these capsules I prepare suitable gelatin sheets about a sixteenth of an inch thick and having about the consistency of soft rubber. In making these sheets I preferably introduce a harmless flavoring extract, whereby in taste and smell the capsule may be made attractive to the patient. For this purpose essential oils such as peppermint, wintergreen, or vanillin may be used. If an agreeable odor is desired, an aromatic oil will be used. In some cases it is also desirable to color the sheets violet or green or pink, so as to make the resulting capsule more attractive in appearance. Each gelatin sheet is a little larger than the surface of the die containing the compression edges, and one of them is placed upon the lower die. This is illustrated in Fig. 2, where $g$ is the gelatin sheet, resting upon the upper surface of the die with its edges raised by the frame of the die, so as to form it into a shallow dish. The next step of the process is to introduce and properly distribute upon this sheet as many solid tablets as there are to be capsules formed. For this purpose I employ the tablet-distributer which is illustrated in section in Fig. 3. It consists of a lower plate $d$ and an upper plate $d'$, both of which are perforated by numerous apertures $e\ e'$, having an outline similar to but slightly larger than the tablets which are to be distributed by it. The positions of the openings $e$ in the lower plate $d$ correspond accurately to the relative positions of the orifices $a$ in the lower die A. Likewise the openings $e'$ in the upper plate $d'$ are similarly spaced, but, as seen in Fig. 3, the upper plate is capable of being slid upon the lower until its perforations are out of line with those of the lower plate. When thus slid, the openings $e'$ form shallow pockets, each one of which is capable of containing one of the tablets. With the plates in this position a quantity of the tablets are spread upon the upper plate, and by a slight brushing with the hand one of the tablets may be caused to enter each one of the pockets. This having been done, the tablet-distributer is placed over the lower die, accurate registration being effected by means of the posts B', which enter corresponding openings in the distributer. This is shown in Fig. 4. In this position the upper plate $d'$ is slid so as to bring its perforations into alinement with those of the lower plate, whereupon one tablet drops upon the gelatin sheet directly over each of the orifices $a$. The tablet-distributer is then removed, and in place a pressing-plate H, Fig. 5, is similarly placed on the die. This has a lower surface $h$, of rubber or leather or similar material, and by it sufficient slight pressure is imparted to each tablet to form a small depression or cup in the sheet surrounding each tablet, which tends to hold it in place. As a result of this operation the gelatin sheet and the tablets occupy the position shown in Fig. 6. Next an accurately-measured quantity of the fluid to be introduced into the capsules is poured upon the gelatin sheet, as indicated in Fig. 7. The slight adherence of the tablets to the sheet enables the liquid to flow evenly all over the sheet without disturbing the relative position of the tablets. An upper gelatin sheet $g'$ is then laid over the lower sheet and its contents, as seen in Fig. 8. The upper die B is now placed upon the lower one, and by the momentary application of heavy pressure this die is caused to slide within its surrounding frame C down into close contact with the lower die. The result is illustrated in Fig. 9. The upper die, it will be understood, has orifices and compression edges corresponding precisely to those of the lower die, and the pressure forces the liquid contents between the sheets into the capsules formed between each pair of opposed orifices, as well as into some of the intermediate spaces, and causes it to be distributed very evenly. The pressure not only cleanly severs the gelatin sheets into the proper shape for the formation of the capsules, but forces the opposing edges of the upper and lower sheets so tightly together as to form a closely-knit equatorial suture around each capsule. The resulting capsule is illustrated in Figs. 10 to 12. Each one consists of a gelatin spheroid with two equal hemispheres, one formed from the lower gelatin sheet $g$ and one from the upper gelatin sheet $g'$. Within each capsule, in addition to the liquid contents, is one of the solid tablets T. This tablet is made so as to be insoluble in the liquid which the capsule contains. If, as is often the case, this liquid is an oil, sugar-coating of the tablet may often be resorted to in order to make it insoluble in the oil.

In cases where it is desired to render the tablet proof against the acid stomach-juices and at the same time soluble in the alkaline secretions of the duodenum and intestinal tract it is preferable to employ a vegetable coating—as, for instance, a thin coating of shellac—and in this way may be obtained the successive functional activity of the capsule to which I have referred.

This capsule as a product I believe to be superior to others used for these purposes and wholly novel. I also believe that the process by which it is produced is novel, and I therefore claim as my invention—

1. The hereinbefore-described medicinal capsule which consists of two similar hemispheroidal sheets of gelatin united by an equatorial suture; and which is filled with a liquid ingredient; and which has freely suspended within the liquid, a tablet which is insoluble in the liquid, substantially as described.

2. The process of manufacturing medicinal capsules containing both solid and liquid ingredients, which consists in placing a gelatin sheet upon a die having compression edges for the formation of a series of capsules therefrom; depositing thereon the solid ingredient, in the form of tablets insoluble in the liquid ingredient, one tablet being placed coincidently with each of the capsule-forming compression-surfaces of the die beneath;

pouring the liquid ingredient over these tablets, while they are *in situ* without disturbing their arrangement upon the gelatin sheet; placing a second gelatin sheet over the first one and its contents thus distributed; placing an upper die similar to the lower on top of the two sheets and their contents; and submitting the two to heavy pressure, whereby a series of capsules, each containing a like quantity of liquid ingredient and each containing one tablet, are cut from the sheets and their contents all substantially as and for the purposes specified.

3. The process of manufacturing medicinal capsules containing both solid and liquid ingredients, which consists in placing a gelatin sheet upon a die having compression edges for the formation of a series of capsules therefrom; depositing thereon the solid ingredient, in the form of tablets insoluble in the liquid ingredient, one tablet being placed coincidently with each of the capsule-forming compression-surfaces of the die beneath; pressing the tablets upon the gelatin sheet until a slight impression is formed around each; pouring the liquid ingredient over these tablets, while they are *in situ* without disturbing their arrangement upon the gelatin sheet; placing a second gelatin sheet over the first one and its contents thus distributed; placing an upper die similar to the lower on top of the two sheets and their contents; and submitting the two to heavy pressure, whereby a series of capsules, each containing a like quantity of liquid ingredient and each containing one tablet, are cut from the sheets and their contents all substantially as and for the purposes specified.

In witness whereof I have signed my name to this specification, this 14th day of March, 1903, in the presence of two subscribing witnesses.

ANTHONY M. HANCE.

Witnesses:
JAMES H. BELL,
M. K. TRUMBORD.